US009236943B2

(12) United States Patent
Ma et al.

(10) Patent No.: US 9,236,943 B2
(45) Date of Patent: Jan. 12, 2016

(54) METHOD OF ELIMINATING OFFSET IN SPOT CENTROID DUE TO CROSSTALK

(71) Applicant: The Institute of Optics and Electronics, The Chinese Academy of Sciences, Sichuan (CN)

(72) Inventors: Xiaoyu Ma, Sichuan (CN); Changhui Rao, Sichuan (CN); Kai Wei, Sichuan (CN)

(73) Assignee: The Institute of Optics and Electronics, The Chinese Academy of Sciences, Sichuan (CN)

( * ) Notice: Subject to any disclaimer, the term of this patent is extended or adjusted under 35 U.S.C. 154(b) by 122 days.

(21) Appl. No.: 13/965,891

(22) Filed: Aug. 13, 2013

(65) Prior Publication Data

US 2014/0178078 A1 Jun. 26, 2014

(30) Foreign Application Priority Data

Aug. 14, 2012 (CN) .......................... 2012 1 0288531

(51) Int. Cl.
*H04B 10/118* (2013.01)
*H04B 10/69* (2013.01)
*H04N 5/359* (2011.01)
*G01S 3/784* (2006.01)
*H04B 10/071* (2013.01)
(Continued)

(52) U.S. Cl.
CPC .............. *H04B 10/118* (2013.01); *G01S 3/784* (2013.01); *H04B 10/071* (2013.01); *H04B 10/079* (2013.01); *H04B 10/697* (2013.01); *H04N 5/359* (2013.01); *G01J 1/4228* (2013.01)

(58) Field of Classification Search
USPC ................................................ 398/118–131
See application file for complete search history.

(56) References Cited

U.S. PATENT DOCUMENTS

| 5,448,053 | A | * | 9/1995 | Rhoads | ...................... 250/201.9 |
| 6,005,916 | A | * | 12/1999 | Johnson et al. | ................. 378/87 |
| 6,347,001 | B1 | * | 2/2002 | Arnold | ................. H04B 10/118 |
| | | | | | 398/122 |

(Continued)

FOREIGN PATENT DOCUMENTS

| JP | 10-051603 | * | 2/1998 | ............... H04N 1/19 |
| JP | 2004-336339 | * | 11/2004 | ............. H04N 5/335 |

OTHER PUBLICATIONS

Xia, J.; "*Design of an Optical Collimation and Automatic Tracking System*;" Electronics Optics & Control, 2009, 16(5), 74-77; abstract retrieved on Sep. 17, 2013 from <http://en.cnki.com.cn/Article_en/CJFDTOTAL-DGKQ200905019.htm>.

(Continued)

*Primary Examiner* — Li Liu
(74) *Attorney, Agent, or Firm* — Alston & Bird LLP (57) ABSTRACT

There is provided a method of eliminating an offset in a spot centroid due to crosstalk. A crosstalk matrix is used to characterize crosstalk characteristics of a multi-pixel spot-centroid detector. Left-multiplication of signals outputted from the multi-pixel spot-centroid detector, which are affected by the crosstalk, by an inverse matrix of the crosstalk matrix can result in a light-intensity-distribution signal with impacts of the crosstalk substantially removed. Based on this light-intensity-distribution signal, it is possible to derive the spot centroid, with the offset in the spot centroid due to the crosstalk substantially eliminated, resulting in an improved accuracy of the spot centroid detection, as compared with conventional methods.

1 Claim, 6 Drawing Sheets

(51) Int. Cl.
*H04B 10/079* (2013.01)
*G01J 1/42* (2006.01)

(56) References Cited

U.S. PATENT DOCUMENTS

| | | | |
|---|---|---|---|
| 2005/0142033 A1* | 6/2005 | Glezer et al. | 422/58 |
| 2006/0024061 A1* | 2/2006 | Wirth et al. | 398/129 |
| 2007/0057211 A1* | 3/2007 | Bahlman et al. | 250/584 |
| 2008/0008472 A1* | 1/2008 | Dress et al. | 398/66 |
| 2011/0031418 A1* | 2/2011 | Shcherback et al. | 250/559.29 |
| 2011/0069960 A1* | 3/2011 | Knapp et al. | 398/103 |
| 2012/0206635 A1* | 8/2012 | Kikuchi et al. | 348/308 |
| 2014/0152986 A1* | 6/2014 | Trainer | 356/336 |

OTHER PUBLICATIONS

Xiaofeng, L., et al., "*Effect of Background Light and Atmospheric Turbulence to Spots Received in Space-to-Ground Laser Communications*;" Wireless Optical Communications, 2004(10), 22-24.

* cited by examiner

METHOD OF ELIMINATING OFFSET IN SPOT CENTROID DUE TO CROSSTALK

CROSS REFERENCE TO RELATED APPLICATION

This application claims priority to Chinese Patent Application No. 201210288531.6, filed Aug. 14, 2012, the entire contents each of which are incorporated herein by reference.

TECHNICAL FIELD

The present disclosure relates to the field of multi-pixel spot-centroid detection, and particularly, to spot-centroid detection by a detector with inter-pixel crosstalk.

BACKGROUND

The satellite-earth optical communication technology adopts optical communication links between satellites and the earth by means of laser beams as a carrier. As compared with the microwave communication technology commonly used at present, the satellite-earth optical communication technology has advantages such as high communication capacity, small system size, light weight, high security, little electromagnetic interference, and broad band. Thus, many countries have put great efforts to researches on the satellite-earth optical communication technology. Among those countries, Japan firstly succeeded in a satellite-earth optical communication test based on an ETS-VI system in July 1995. The test proved the feasibility of the satellite-earth laser communications. US JPL (Jet Propulsion Lab) developed an OCD (Optical Communications Demonstrator) with a data transfer rate up to 250 Mbps. The STRV2 satellite-earth laser communication project funded commonly by US BMDO (Ballistic Missile Defense Organization) and Space and Missile Defense Command planned to establish an optical communication link, with a distance of 2000 km and a data transfer rate of 1 Gpbs, between a LEO (Low Earth Orbit) satellite and a stationary ground station. AREMIS, a GEO satellite developed by ESA (European Space Agency), was launched in 2000, and has an optical link which can implement communications between this satellite and a ground station located on Canary Island.

The ATP (Acquisition, Tracking, Pointing) technology is a key one to be improved in the field of the satellite-earth optical communications. An ATP system is composed of a tilt tracker, a control unit and a drive unit. In operation of the system, the tilt tracker is able to provide an amount of tilt in a wavefront of a target to the control unit in real time. The control unit calculates an amount of voltage to be loaded to the drive unit based on the tilt amount of the wavefront. The drive unit can rotate by a certain angle in a certain direction due to the voltage, so that an entrance pupil of the system can be aligned with the object in moving. (See Jiangtao XIA, Design of an Optical Collimation and Automatic Tracking System, Electronics Optics & Control, 2009, 16(5), 74-77.)

In an ATP system for the satellite-earth optical communications, optical transmission must pass through the atmosphere which is a random channel. Due to low-order aberrations caused by atmospheric turbulence and also the movement of the satellite, a light spot arriving at the system may present a wide range of random jitters (see Xiaofeng LI & Yu HU, "Effect of Background Light and Atmospheric Turbulence to Spots Received in Space-to-Ground Laser Communications," Wireless Optical Communications, 2004 (10), 22-24). Further, in the satellite-earth optical communications, laser signals from the satellite have limited transmitting power due to loading capacity limitations of space crafts, and will have most energy thereof scattered and absorbed by the atmosphere after a long travel in the atmosphere (see Shuhua LIU, "Solution Designs, Analyses on Key Techniques, and Channel Simulations in Space-to-Ground Communications System," a dissertation for Master Degree in University of Electronic Science and Technology of China, 2002). To ensure a fluent satellite-earth optical communication link, the tilt tracker in the ATP system, which provides the tilt amount in the wavefront of the target, must meet requirements, such as a wide dynamic range, a high detection precision, a high sensitivity, a high frame frequency, and the like.

The tilt tracker generally comprises an imaging lens, a photoelectric converter, and a wavefront tilt handling device. An optical signal from the target is converged by the imaging lens to be projected onto a photosensitive surface of the photoelectric converter to form a target spot. When the target has the tilt amount of its wavefront changed, the target spot moves on the photosensitive surface of the photoelectric converter. As a result, a distribution of optical energy on the photosensitive surface is changed. At this time, the wavefront tilt handling device can calculate the position of a centroid of the target spot based on an electric signal outputted from the photoelectric converter, and thus derive the tilt amount in the wavefront of the target. Currently, the photoelectric converter is generally implemented by a CCD camera, a CMOS camera, or a multi-anode PMT. However, the CCD camera is limited in applications of high frame frequency detections due to its disadvantages such as low readout frame frequency, and the CMOS camera is limited in applications of weak light detections due to its disadvantages such as large noise and low photosensitivity. The multi-anode PMT is composed of multiple PMTs (PhotoMultiplier Tubes) integrated into a single package based on a certain spatial design, with signals outputted at different pins corresponding to different spatial locations of optical cathodes. Thus, the multi-anode PMT can function as a multi-pixel spot-centroid detector.

However, due to manufacture processes, there is no shield provided at anodes of the multi-anode PMT. As a result, when the multi-anode PMT operates in a photon counting state, generation of a photoelectric pulse at one pixel is accompanied by generation of a smaller electrical pulse at another pixel, due to inter-electrode capacitance coupling. If the smaller pulse caused by such crosstalk becomes greater than a threshold level, it will be deemed by a backend circuit as a photoelectric pulse, resulting in a dummy photon count. The dummy photon count significantly impacts the accuracy of the outputted signals and thus the accuracy of the spot-centroid detection.

In order to ensure the requirements on the tilt tracker in the ATP system adopted in the satellite-earth optical communications, such as high detection precision, high sensitivity, high frame frequency, and the like, it becomes an important research object to provide a solution to reduce the impacts of the inter-pixel crosstalk in the multi-pixel spot-centroid detector on the spot-centroid detection accuracy.

SUMMARY

The present disclosure aims to provide, among others, a method of eliminating an offset in a spot centroid due to crosstalk, so as to overcome offset errors in spot-centroid detection caused by errors in outputted signals due to inter-pixel crosstalk in a multi-pixel spot-centroid detector manufactured by existing manufacture processes.

According to an embodiment of the present disclosure, there is provided a method of eliminating an offset in a spot centroid due to crosstalk, comprising measuring crosstalk ratios between respective pixels of a detector by a crosstalk-ratio measuring device, arranging the crosstalk ratios between the respective pixels into a crosstalk matrix characterizing crosstalk characteristics of the detector, left-multiplying signals outputted from the detector by an inverse matrix of the crosstalk matrix to derive a light-intensity-distribution signal with impacts of the crosstalk substantially removed, and calculating the spot centroid based on the light-intensity-distribution signal. Therefore, it is possible to substantially eliminate the offset in the spot centroid due to the crosstalk, resulting in an improved detection accuracy of the spot centroid.

Figure 3:
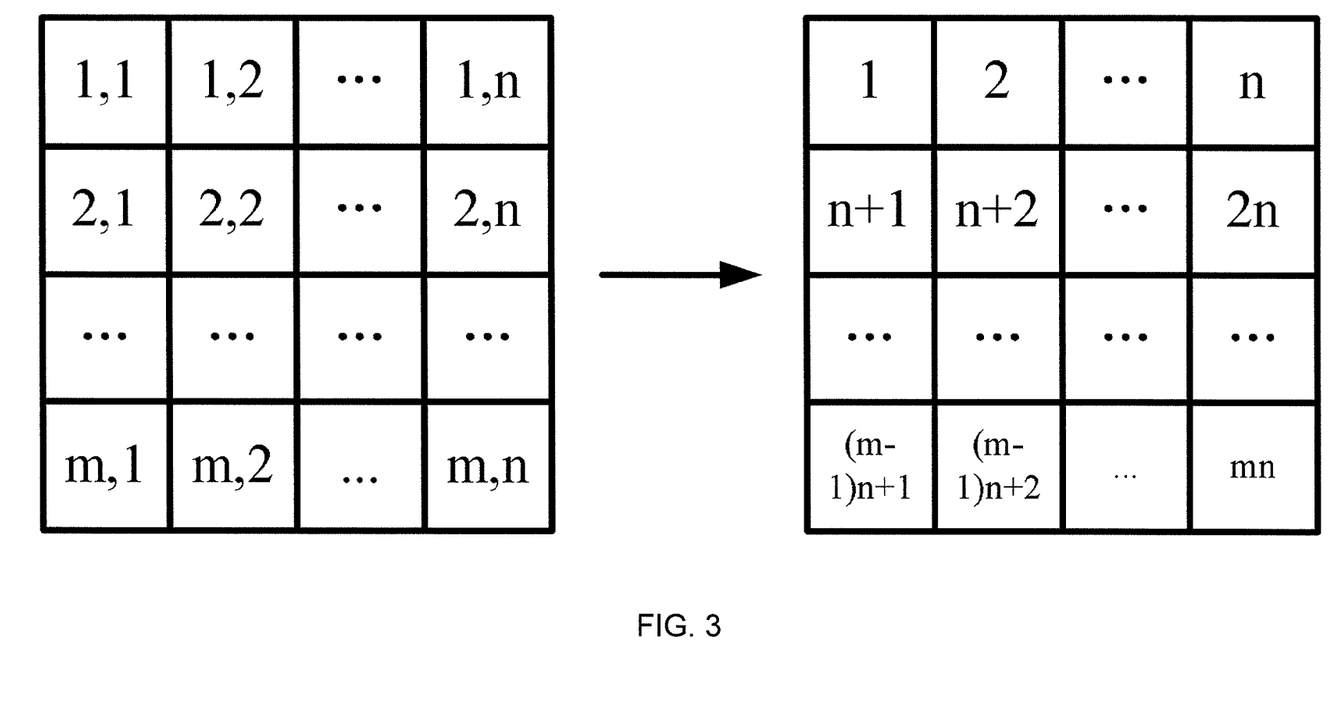
FIG. 3 is a schematic view showing an arrangement of pixels and numbering of the pixels according to an embodiment of the present disclosure.

The crosstalk matrix constitutes a bridge between true signals arriving at the detector and the signals outputted from the detector. The pixels of the detector may be numbered as shown in FIG. 3. When the detector has m×n pixels, the pixels can be numbered from 1 to l, where l=m×n. The crosstalk ratio between every two pixels can be measured as $c_{ij}$. All the measured crosstalk ratios can be arranged into a matrix, such as one shown in the following:

$$C = \begin{bmatrix} 1 & c_{12} & c_{13} & \ldots & c_{1l} \\ c_{21} & 1 & c_{23} & \ldots & c_{2l} \\ c_{31} & c_{32} & 1 & \ldots & c_{3l} \\ \ldots & \ldots & \ldots & \ldots & \ldots \\ c_{l1} & c_{l2} & c_{l3} & \ldots & 1 \end{bmatrix}.$$

The element $c_{ij}$ in the crosstalk matrix C has a physical meaning that a true signal $P_j$ arriving at a j-th pixel will cause a dummy signal of $c_{ij} \cdot P_j$ at a i-th pixel due to the crosstalk.

Figure 1:
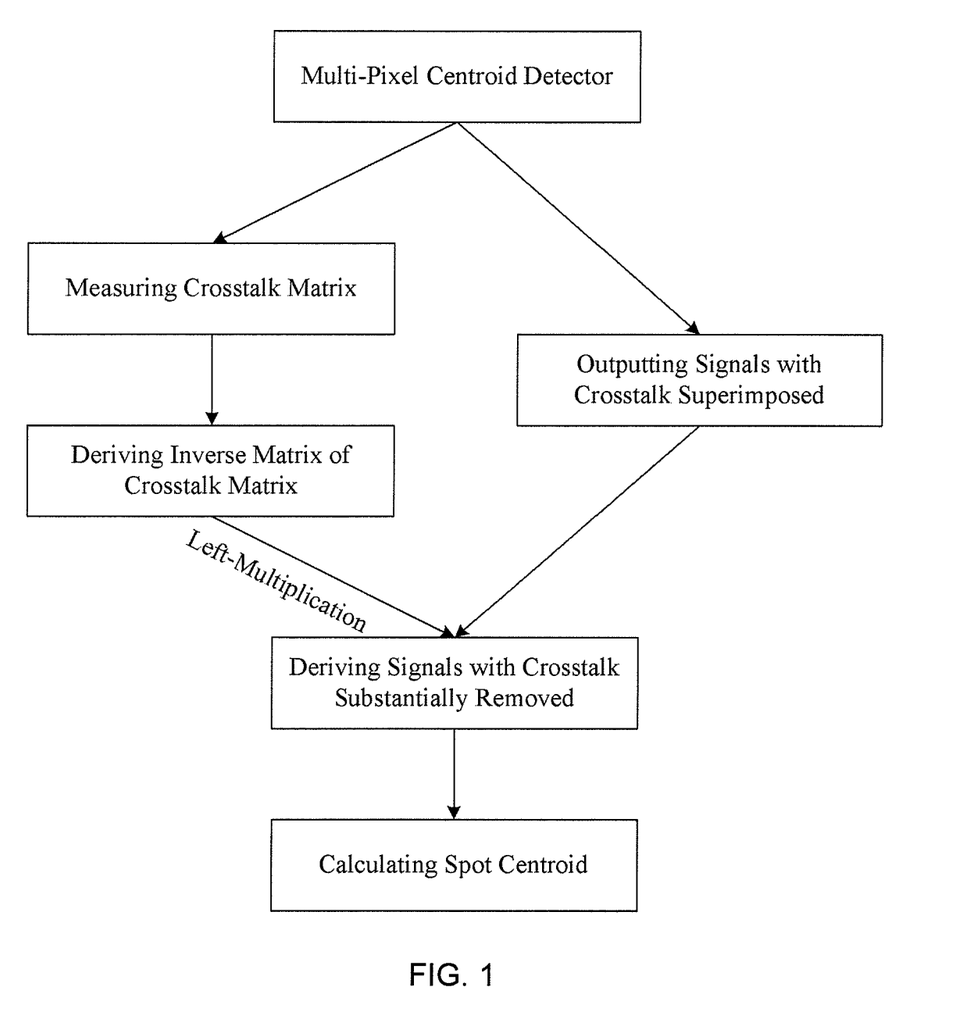
FIG. 1 is a flowchart showing a method of eliminating an offset in a spot centroid due to crosstalk according to an embodiment of the present disclosure.
Figure 2:
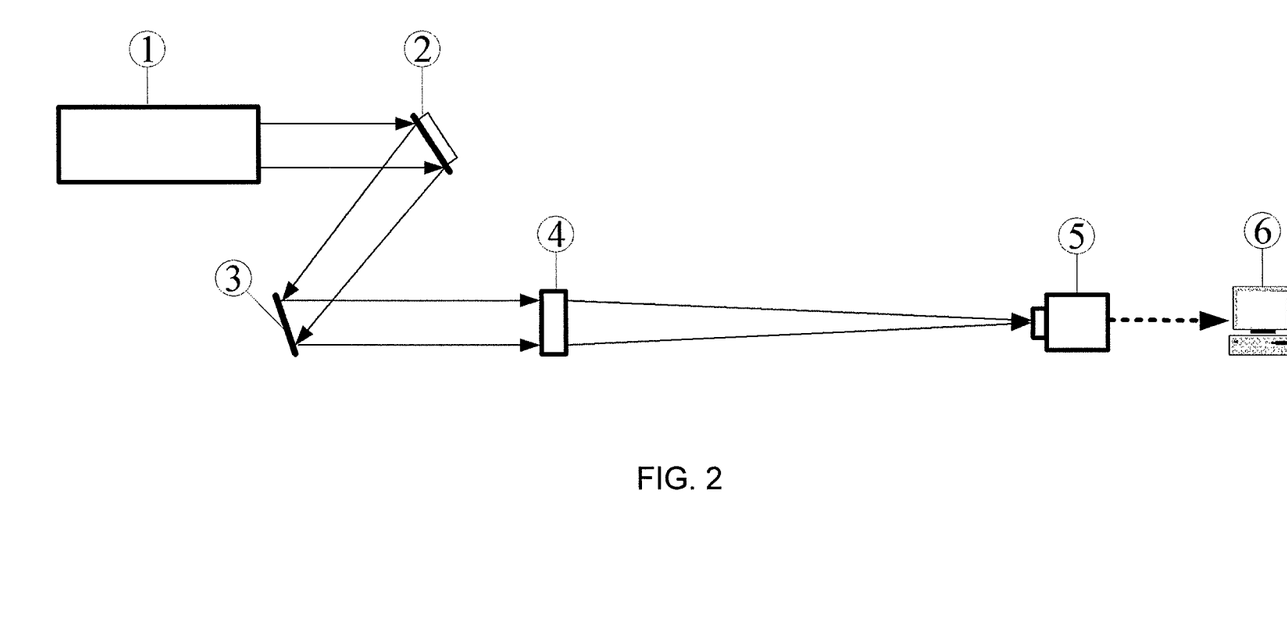
FIG. 2 is a structural diagram showing an apparatus for measuring inter-pixel crosstalk of a multi-pixel spot-centroid detector according to an embodiment of the present disclosure.

An example of the crosstalk-ratio measuring device is shown in FIG. 2. As shown in FIG. 2, the device comprises a parallel-light source 1, a two-dimensionally adjustable reflector 2, a reflector 3, and an imaging lens 4. The parallel-light source 1 is configured to emit parallel light beams, which are reflected by the two-dimensionally adjustable reflector 2 and then further reflected by the reflector 3, and then are converged by the imaging lens 4 onto a multi-pixel spot-centroid detector 5 to form a spot thereon. A position where the spot is located on the multi-pixel spot-centroid detector 5 can be adjusted by adjusting a reflecting angle of the two-dimensionally adjustable reflector 2. When the spot is located completely within the j-th pixel, signals outputted from the 1-th to l-th pixels, i.e., $P_1$ to $P_l$, are recorded. The elements $c_{ij}$ (i∈[1~l]) on the j-th column in the crosstalk matrix C can be calculated as $c_{ij}=P_i/P_j$. The above operations for measuring the crosstalk ratios can be repeated with respect to the respective pixels of the multi-pixel spot-centroid detector so as to derive the crosstalk matrix C.

According to embodiments of the present disclosure, there can be following advantages.

Specifically, the crosstalk matrix is adopted to characterize the crosstalk characteristics between the respective pixels of the multi-pixel spot-centroid detector. Left-multiplication of the signals outputted from the multi-pixel spot-centroid detector by the inverse matrix of the crosstalk matrix can restore the light-intensity-distribution signal with the impacts of the crosstalk substantially removed. Based on this light-intensity-distribution signal, it is possible to derive the spot centroid, with the offset in the spot centroid due to the crosstalk substantially eliminated, resulting in an improved accuracy of the spot centroid detection.

Further, there is provided an apparatus and a method of measuring crosstalk ratios between respective pixels of a multi-pixel spot-centroid detector. By means of the apparatus and the method, it is possible to measure the crosstalk ratios between the respective pixels of the multi-pixel spot-centroid detector in a simple, quick and accurate manner, so as to derive a crosstalk matrix characterizing crosstalk characteristics between the respective pixels of the multi-pixel spot-centroid detector.

DETAILED DESCRIPTION

A multi-pixel spot-centroid detector manufactured by existing manufacture processes, such as one indicated by 5 in the drawings, may have inter-pixel crosstalk. As a result, calculation of a spot centroid directly from signals outputted from the multi-pixel spot-centroid detector 5 will cause a significant offset error. According to embodiments of the present disclosure, a crosstalk matrix is adopted to characterize crosstalk characteristics between respective pixels of the multi-pixel spot-centroid detector 5. Specifically, crosstalk ratios between the respective pixels of the multi-pixel spot-centroid detector 5 can be measured by an inter-pixel crosstalk-ratio measuring device, and all the measured crosstalk ratios between the respective pixels then can be arranged into the crosstalk matrix. Thus, the signals outputted from the multi-pixel spot-centroid detector 5 can be left-multiplied by an inverse matrix of the crosstalk matrix to obtain output signals with the crosstalk substantially removed, which are in turn used to calculate a position of the spot centroid.

In an example, the multi-pixel spot-centroid detector 5 has its pixels arranged in an array of 20×20. In such a case, the inventive method can be implemented as follows.

(1) The pixels of the multi-pixel spot-centroid detector 5 can be numbered from 1 to 400, as shown in FIG. 3.

(2) A reflecting angle of the two-dimensionally adjustable reflector 2 can be adjusted so that a spot converged by the imaging lens 4 is concentrated completely within the pixel numbered 1 (the converged spot may have a Gaussian width <1/3 times a size of the pixel).

(3) Signals outputted from the 20×20 pixels of the multi-pixel spot-centroid detector 5 can be recorded by a computer 6, and then can be arranged in an order in which the pixels of the multi-pixel spot-centroid detector 5 are numbered, to derive a vector $a_1=k_1 \cdot [s_{(1,1)}, s_{(1,2)}, s_{(1,3)} \ldots s_{(1,400)}]$, where $s_{(i,j)}$ denotes an output value from a j-th pixel when the spot is located within a i-th pixel, and $k_1=1/s_{(1,1)}$.

(4) Operations of (2) and (3) can be repeated for the remaining pixels. Specifically, the reflecting angle of the two-dimensionally adjustable reflector 2 can be adjusted gradually so that the spot converged by the imaging lens 4 scans from the 1-numbered pixel to the 400-numbered pixel. The computer 6 records signals outputted from the multi-pixel spot-centroid detector 5 to derive vectors $a_1$ to $a_{400}$, where $k_i$ assumes a value of $1/s_{(i,i)}$.

Figure 4:
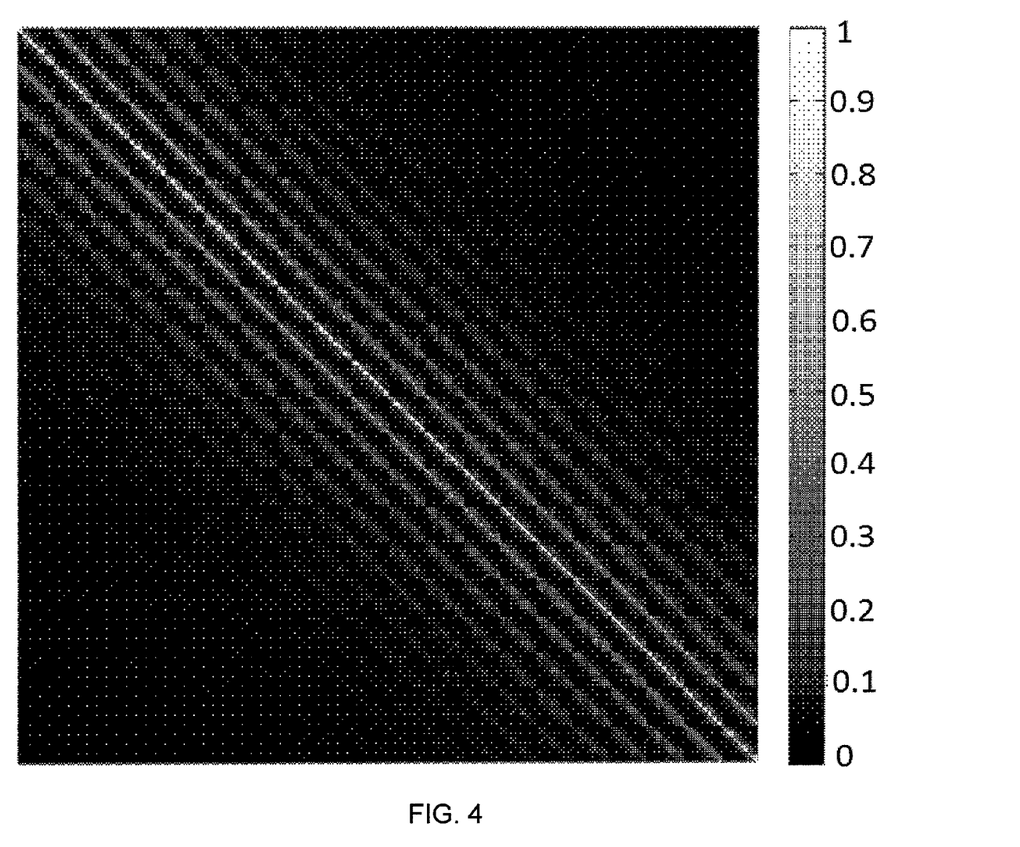
FIG. 4 is a diagram showing a crosstalk matrix according to an embodiment of the present disclosure.

(5) A crosstalk matrix of the multi-pixel spot-centroid detector 5 can be calculated as $C=[a'_1\ a'_2 \ldots a'_{400}]$, where "'" denotes transpose of a matrix. The crosstalk matrix has a size of 400×400. An example diagram of the crosstalk matrix is shown in FIG. 4. From the diagram, it can be seen that the smaller is the spatial distance between the pixels, the more significant is the crosstalk and thus the greater is the crosstalk ratio therebetween.

(6) An inverse matrix D of the crosstalk matrix C can be calculated.

Figure 5:
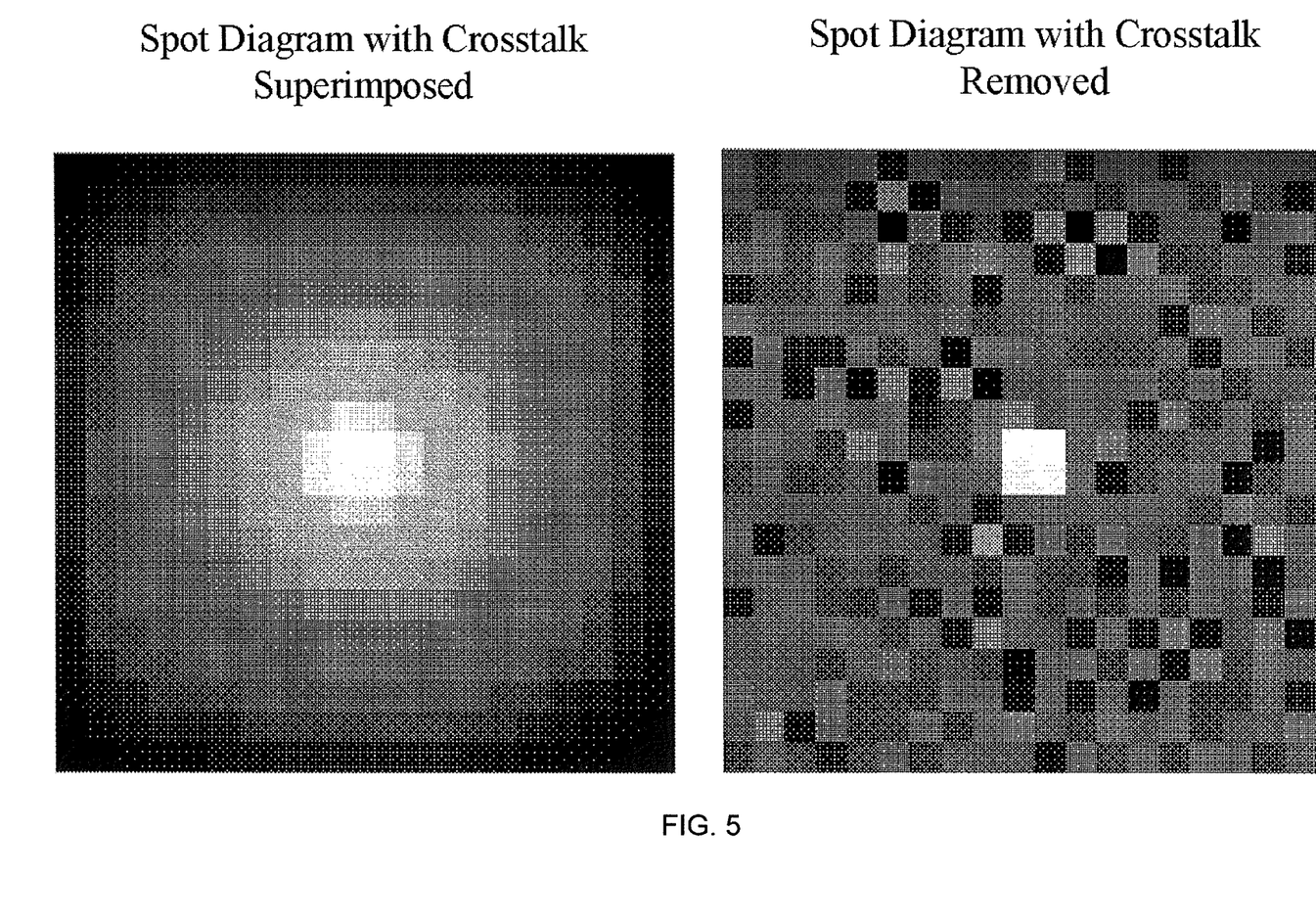
FIG. 5 shows a spot diagram with crosstalk superimposed (on the left side) and a spot diagram with crosstalk removed (on the right side), respectively, according to an embodiment of the present disclosure.

(7) Spot-centroid detection is carried out by the multi-pixel spot-centroid detector 5, to obtain an array of output signals with the crosstalk superimposed (as shown on the left side in FIG. 5). The output signals in the array can be numbered from 1 to 400 in the manner as shown in FIG. 3, to derive a vector $E=[e_1, e_2, \ldots e_{400}]'$, where $e_i$ indicates a value outputted from the i-th pixel, and "'" indicates transpose of a matrix.

(8) The vector E can be left-multiplied by the inverse matrix D of the crosstalk matrix, to derive a signal vector $E_a$ with the crosstalk substantially removed. That is, $$E_a = D*E.$$

(9) The signal vector $E_a$ with the crosstalk substantially removed can be rearranged into an m×n array of spot signals in the manner of numbering shown in FIG. 3, to derive an array of spot signals, $E_m$, with the crosstalk substantially removed, as shown on the right side of FIG. 5.

(10) The spot centroid can be calculated based on the array of spot signals with the crosstalk substantially removed in accordance with, for example, the following equation:

$$x_c = \frac{\sum_{j=1}^{n}\sum_{i=1}^{m} [j \cdot E_m(i,j)]}{\sum_{i=1}^{m}\sum_{j=1}^{n} E_m(i,j)}, \quad y_c = \frac{\sum_{i=1}^{m}\sum_{j=1}^{n} [i \cdot E_m(i,j)]}{\sum_{i=1}^{m}\sum_{j=1}^{n} E_m(i,j)}.$$

Figure 6:
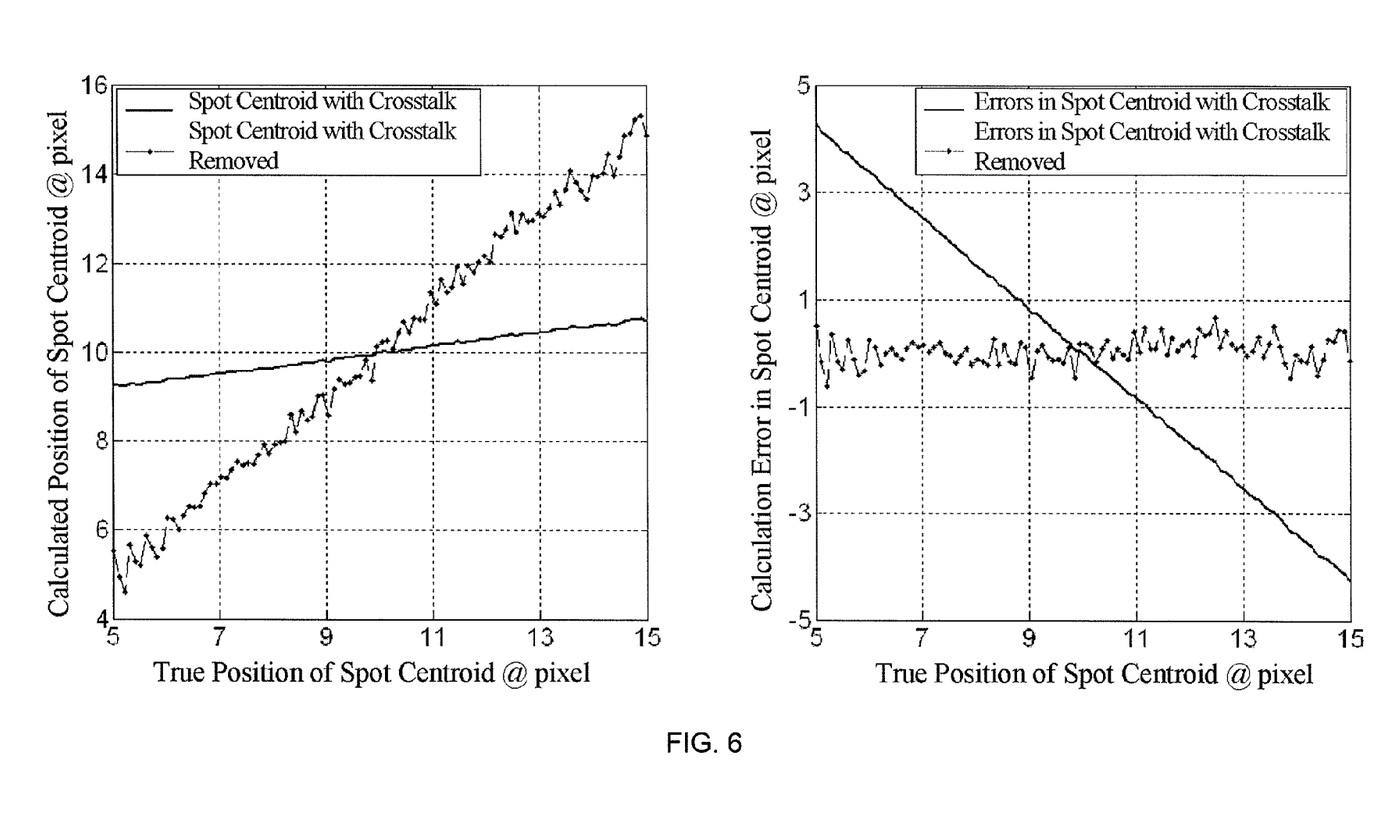
FIG. 6 shows graphs illustrating spot-centroid positions before and after crosstalk is removed (on the left side) and graphs illustrating errors in spot-centroid detection before and after crosstalk is removed, respectively, according to an embodiment of the present disclosure.

FIG. 6 shows, on the left side, graphs illustrating spot-centroid positions before and after the crosstalk is removed, respectively. Obviously, the graph illustrating the spot-centroid positions before the crosstalk is removed is gentler, indicating that the crosstalk significantly impacts the positional sensitivity of the multi-pixel spot-centroid detector 5 and thus causes offset errors of the spot centroid. FIG. 6 shows, on the right side, graphs illustrating errors in the spot-centroid detection before and after the crosstalk is removed, respectively. Obviously, the errors in the spot-centroid detection before the crosstalk is removed increase as the spot centroid is more distant from a central position of the multi-pixel spot-centroid detector 5. In contrast, the errors in the spot-centroid detection after the crosstalk is removed exhibit only fluctuations due to noises.

As can be seen from FIG. 6, the method according to the present disclosure enables substantial elimination of the offset errors of the spot centroid due to the inter-pixel crosstalk of the multi-pixel spot-centroid detector 5, resulting in an improved accuracy in the spot-centroid detection.

Those means well known to those skilled in the art are not described in detail in the present disclosure.

From the foregoing, it will be appreciated that specific embodiments of the disclosure have been described herein for purposes of illustration, but that various modifications and alternations may be made by those skilled in the art without deviating from the disclosure. All these modifications and alternations fall in the scope of the present disclosure.

The invention claimed is:

1. A method of eliminating an offset in a spot centroid due to crosstalk, comprising:
   measuring crosstalk ratios between respective pixels of a detector by a crosstalk-ratio measuring device;
   arranging the crosstalk ratios between the respective pixels into a crosstalk matrix characterizing crosstalk characteristics of the detector;
   left-multiplying signals outputted from the detector by an inverse matrix of the crosstalk matrix to derive a light-intensity-distribution signal with impacts of the crosstalk substantially removed; and
   calculating the spot centroid based on the light-intensity-distribution signal,
   wherein the crosstalk-ratio measuring device comprises:
   a parallel-light source configured to emit parallel light beams;
   a two-dimensionally adjustable reflector configured to reflect the parallel light beams from the parallel-light source;
   a reflector configured to further reflect the light beams reflected by the two-dimensionally adjustable reflector;
   an imaging lens configured to converge the light beams reflected by the reflector onto the multi-pixel spot-centroid detector to form a spot thereon;
   a computer configured to record signals outputted from the multi-pixel spot-centroid detector; and
   wherein measuring the crosstalk ratios comprises:
   numbering the pixels of the detector from 1 to l, where l=m×n indicates a total number of the pixels of the detector; and
   measuring the crosstalk ratio $c_{ij}$ between every two pixels,
   arranging the crosstalk ratios into the crosstalk matrix comprises:
   arranging all the measured crosstalk ratios into a matrix as follows:

$$C = \begin{bmatrix} 1 & c_{12} & c_{13} & \ldots & c_{1l} \\ c_{21} & 1 & c_{23} & \ldots & c_{2l} \\ c_{31} & c_{32} & 1 & \ldots & c_{3l} \\ \ldots & \ldots & \ldots & \ldots & \ldots \\ c_{l1} & c_{l2} & c_{l3} & \ldots & 1 \end{bmatrix},$$

wherein an element $c_{ij}$ in the crosstalk matrix C has a physical meaning that a true signal $P_j$ arriving at a j-th pixel will cause a dummy signal of $c_{ij} \cdot P_j$ at a i-th pixel due to the crosstalk, and wherein measuring the crosstalk ratios comprises:
   adjusting a reflecting angle of the two-dimensionally adjustable reflector to adjust a position where the spot is located on the multi-pixel spot-centroid detector;

recording signals outputted from the 1-th to l-th pixels of the multi-pixel spot-centroid detector, i.e., $P_1$ to $P_l$, when the spot is located completely within the j-th pixel;

calculating the elements $c_{ij}$ on the j-th column in the crosstalk matrix C as $c_{ij}=P_i/P_j$, where $i\epsilon[1\sim l]$; and repeatedly performing above operations with respect to the respective pixels of the multi-pixel spot-centroid detector so as to derive the crosstalk matrix C.

* * * * *